A. Viridet,
Bridle Bit.
No. 90,612. Patented May 25, 1869.
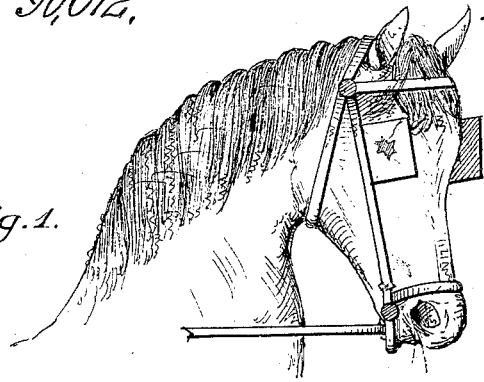
Fig. 1.
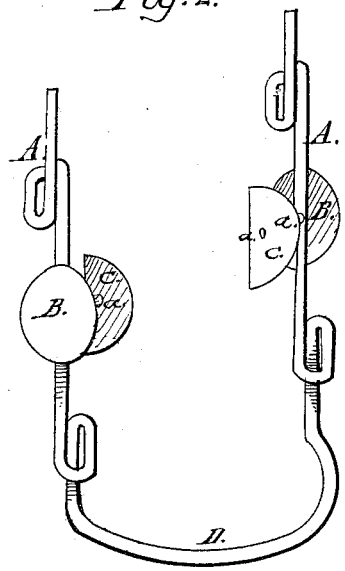
Fig. 2.
Fig. 3.
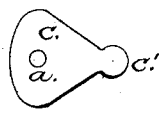
Witnesses:
Jo. L. Coombs
Thomas Coombs
Inventor:
Adrien Viridet
by
J. L. Coombs
Atty.

ADRIEN VIRIDET, OF GLASGOW, KENTUCKY.

Letters Patent No. 90,612, dated May 25, 1869.

IMPROVED BRIDLE-BIT.

The Schedule referred to in these Letters Patent and making part of the same.

*To all whom it may concern:*

Be it known that I, ADRIEN VIRIDET, of Glasgow, in the county of Barren, and State of Kentucky, have invented a new and useful Improvement in Bridle-Bits; and I do hereby declare that the following is a full, clear, and exact description thereof, reference being had to the accompanying drawings.

This invention has for its object the dispensing with the cross-bar passing through the mouth of the horse in bridle-bits, as heretofore constructed.

In the accompanying drawings—

Figure 1 shows the bit attached to a bridle, and in use;

Figure 2 is a perspective view of the bit; and

Figure 3 is a modification of the inner flange C.

A is the frame of the bit;

B B are the cheek-plates; and

C C, flanges that go inside of the lips, and between the lips and the teeth.

The cheek-plate B and flange C are connected together by a short bar, *a*, just long enough to hold the lips between said cheek-plate and flange.

D is a curved cross-bar, which connects the two sides of the frame A rigidly together, passing under the lower jaw.

The flanges C may be made in semicircular form, as shown in fig. 2, or in the lever-form shown in fig. 3, in which last-mentioned form they will be found preferable for hard-mouthed horses as a draught upon the reins will cause the ends C' to press upon the gums with great force, and will prove as effectual as the ordinary lever-bit.

The form of the flanges may be varied otherwise than as herein shown.

I claim that a bridle constructed pursuant to my invention possesses the following advantages over a bit constructed in the usual way, viz:

First, that by drawing on the corners of the mouth only, it gives more control over the horse than with a cross-bar through the mouth.

Second, it prevents the bad habit which some horses have of clamping the bit between the teeth when they want to run away.

Third, it renders it unnecessary to remove the bit to permit the horse to eat, as there is nothing in his mouth to prevent him from chewing his food.

Fourth, it obviates the laceration of the tongue against the teeth, which often occurs when the old cross-bar bit is used.

What I claim as my invention, and desire to secure by Letters Patent, is—

1. A bridle-bit without a cross-bar to pass through the mouth of the horse, constructed substantially as described.

2. In combination with the frame A, the cheek-plates B, flanges C, and short connecting-bars *a*, substantially as and for the purpose described.

ADRIEN VIRIDET.

Witnesses:
JOS. L. COOMBS,
J. J. COOMBS.